L. J. MILLER.

Improvement in Concaves for Corn-Shellers.

No. 132,017. Patented Oct. 8, 1872.

Attest
H. Evry Millward
Charles Straid

Inventor
Louis J. Miller
By H. Millward
Attorney

UNITED STATES PATENT OFFICE.

LOUIS J. MILLER, OF CINCINNATI, OHIO, ASSIGNOR TO WILLIAM BAILEY, OF SAME PLACE.

IMPROVEMENT IN CONCAVES FOR CORN-SHELLERS.

Specification forming part of Letters Patent No. 132,017, dated October 8, 1872.

*To all whom it may concern:*

Be it known that I, LOUIS J. MILLER, of Cincinnati, Hamilton county, State of Ohio, have invented a certain new and useful Improvement in Corn-Shellers, of which the following is a specification:

Nature and Objects of Invention.

My invention relates to an improvement upon the corn-sheller for which Letters Patent No. 70,195 were granted to George Goewey and Howard Eaton, assignees of said George Goewey, October 29, 1867; and consists in a peculiar device for giving an elastic movement to the concave outer case of the sheller, by which a simpler construction of spring is used, and a more durable action of the concaves provided for.

Description of Accompanying Drawing.

Figure 1:
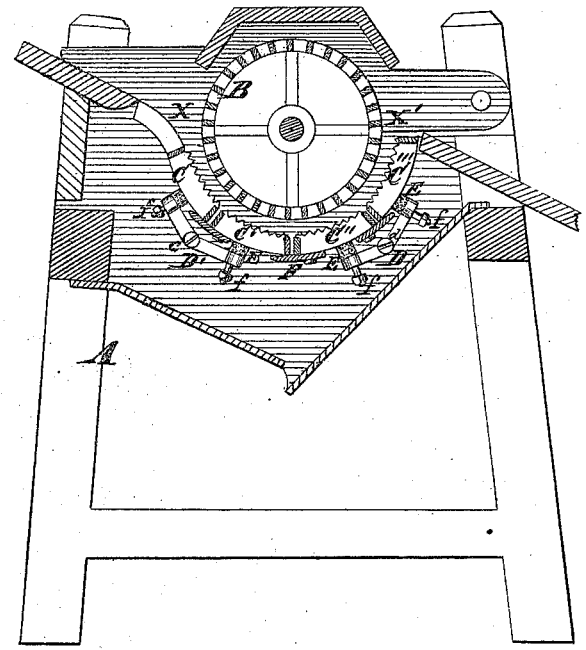
Figure 2:
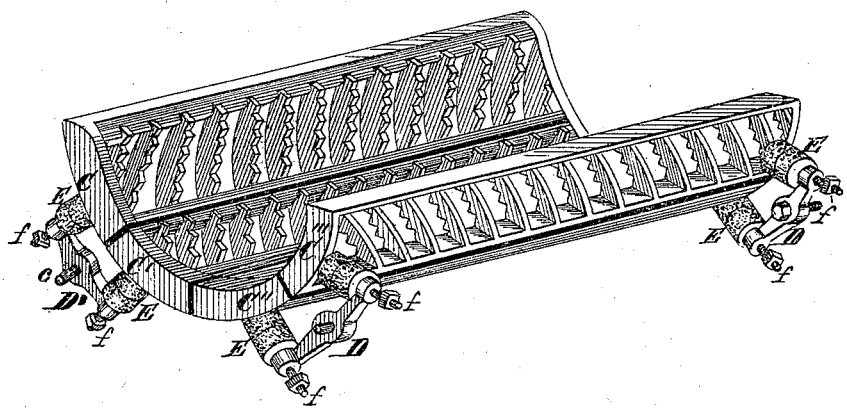

Figure 1 is a sectional elevation of a corn-sheller embodying my invention. Fig. 2 is a perspective view of the sectional concave case of the sheller with my improved spring device attached.

General Description.

A is the frame of the machine; B, the revolving cylinder; and C C′ C″ C‴, the four sections of the concave shelling-case. The entire machine, except the spring device attached to these concave sections, is constructed and operates in the same way as that shown and described in the Letters Patent No. 70,195 aforesaid.

My improved spring device for the concave sections may be described as follows: Between the two sections C″ C‴ levers D are pivoted at $d$ to the frame of the machine at each end of the sections, as shown, and levers D′ are pivoted at $c$ in the same manner between the sections C C′. Between the outer ends of the levers and the exterior surface of the sections C C′ C″ C‴ rubber springs E are introduced, which are retained in place by the screws $f$. The sections are suitably connected to the frame, so as to permit them to move to and from the revolving cylinder to permit different-sized ears of corn to be shelled with equal certainty, and are also so connected to the frame as to permit the sections to oscillate so as to allow the corn to enter the front edge easily. They should be, however, so secured to the frame as to prevent displacement of the sections. The connection between the sections and the frame of the machine may be simply a pin upon the center of each end of each section fitting into corresponding radial grooves in the sides of the frame. Cleats F, which are attached to one section and fitted to allow the next section to be supported upon them, serve to prevent displacement of the sections, as shown in Fig. 1.

In the operation of the machine, as the corn is passed through from X to X′ the springs E are compressed more or less as the ear is of greater or less diameter, and at the same time the levers D vibrate upon their pivots, and thus enable both springs of each lever to come into action. This movement gives an easy gradual action to the springs, which greatly facilitates the perfect operation of corn-shelling and renders the device itself more durable than any heretofore used to give an elastic movement to such concave cases.

Claim.

In combination with the concave sections of a corn-sheller case C C′ C″ C‴, the levers D and D′ and springs E, connected and operating substantially in the manner and for the purpose specified.

In testimony of which invention I hereunto set my hand.

LOUIS J. MILLER.

Witnesses:
 FRANK MILLWARD,
 EDWARD BOYD.